Feb. 8, 1944.  C. G. SUITS  2,341,341

TOASTER

Filed June 29, 1943

Inventor:
Chauncey G. Suits,
by Harry E. Dunham
His Attorney.

Patented Feb. 8, 1944

2,341,341

UNITED STATES PATENT OFFICE 2,341,341

TOASTER

Chauncey G. Suits, Schenectady, N. Y., assignor to General Electric Company, a corporation of New York Application June 29, 1943, Serial No. 492,681

7 Claims. (Cl. 99—331)

This invention relates to toasters, more particularly to automatic toasters, and it has for its object the provision of an improved device of this character.

More specifically, this invention contemplates the provision of improved means for automatically terminating the toasting when the bread slice has been toasted to a predetermined degree.

In accordance with this invention in one form thereof, I provide a member which is periodically driven into and out of engagement with a surface of the bread slice being toasted in order to test its hardness. This member as it is moved into and out of engagement with the slice controls the heating means to apply heat to and shut off the heat from the slice. The proportion of time that heat is applied to the time that it is not applied during the movement of the member into and out of engagement with the slice depends upon the extent of movement of the member permitted by the bread slice; when the bread slice is relatively soft and offers substantially no restriction to the movement of the member, the member moves through a relatively wide path, and the proportion of time that heat is "on" is relatively great; however, as the bread becomes harder and harder as the toasting progresses the movement of the member is restricted and it moves through smaller and smaller paths, and as a result, the proportion of time that the heating means is "on" becomes relatively small, until eventually when the slice has been toasted to the desired degree the heat is shut off completely.

Another feature of this invention resides in the provision of a testing member which is mounted on a fixed pivot and which is periodically moved so that a portion of the member periodically engages the slice in order to test its hardness. And this member controls the heating means in the aforementioned manner to shut off the heat when the bread has been toasted.

Still another feature of this invention is the provision of testing means movable in the plane of the slice so as to engage an end surface of the slice, and thereby, in effect, test the compressibility of the whole slice, rather than merely a single local area thereof.

Figure 1:
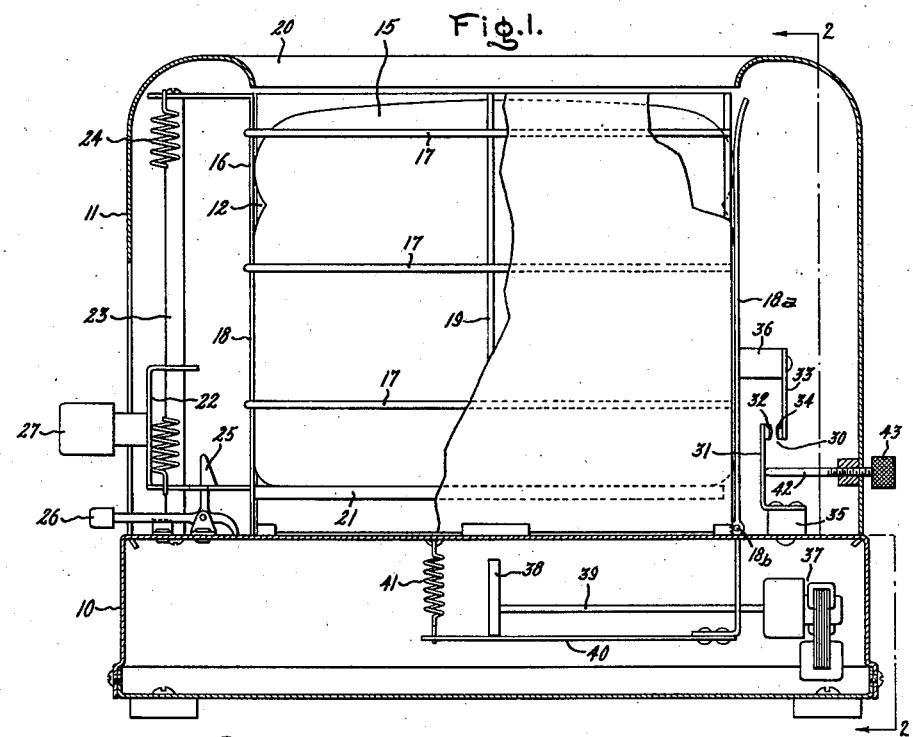
Figure 2:
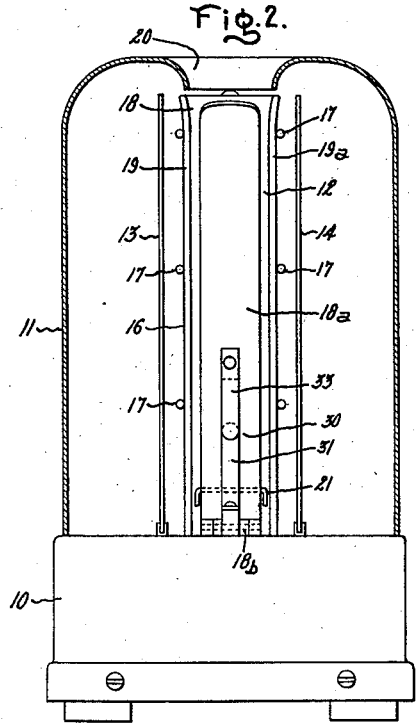

For a more complete understanding of this invention, reference should be had to the accompanying drawing in which Fig. 1 is a longitudinally vertical sectional view taken through an electrically heated automatic toaster embodying this invention; Fig. 2 is a partial sectional view taken along the line 2—2 of Fig. 1 and looking in the direction of the arrows; and Fig. 3 is a diagrammatic representation illustrating the heating elements of the toaster and certain control elements therefor arranged in accordance with this invention.

Referring to the drawing, this invention has been shown as applied to an electrically heated automatic toaster comprising a base casing 10 upon which is mounted an upper casing 11 which houses the heating chamber 12. Mounted on opposite sides of the heating chamber 12 are heating elements 13 and 14 which are shown diagrammatically in Fig. 3. It will be understood that these elements will provide sources of heat on opposite sides of a bread slice 15 mounted within the toasting chamber 12 so as to toast simultaneously the two sides of the bread. Interposed between the heating elements 13 and 14 is a suitable open-work slice holder 16 which is defined by rigid parallel side bars 17 and upright bars 18 and 18a at the ends, and 19 and 19a at the sides. With the exception of the right-hand end bar 18a the remaining rigid bars are rigidly connected together in any suitable way as by welding. The rigid right-hand bar 18a is mounted upon a fulcrum 18b on the top wall of the base 10 so that the member 18a can be oscillated about a fixed axis. The purpose for this will be pointed out in greater detail hereinafter.

The basket or open-work support 16 is open at the top, as shown in Figs. 1 and 2, and the top casing 11 is provided with an elongated opening 20 through which the bread slice 15 may be inserted into the support. At the bottom the bread slice is supported by means of a tray 21 which is movable vertically to move the bread out of the toasting chamber once it has been toasted. The tray 21 is attached to a carriage 22 which is vertically slidable upon a rod 23 fixed in the housing 11. A tension spring 24 is attached to the carriage 22 to bias the tray 21 upwardly. The tray 21 is latched in its toasting position by means of a latch 25 which is manually releasable by means of a manually operable knob 26 in order to permit the spring to move the bread slice up out of the heating chamber. Attached to the carriage 22 is a knob 27 whereby the tray 21 may be manually depressed in order to move the slice into the toasting chamber.

Figure 3:
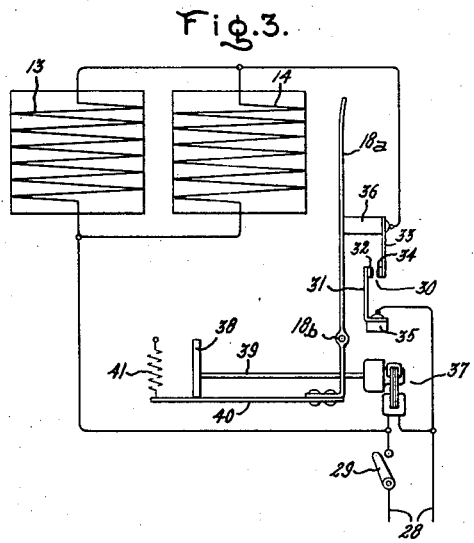

The heating elements 13 and 14 are connected in parallel relation with each other, as shown in Fig. 3, and they are energized from any suitable source of electrical supply 28. Their energization is controlled by means of a manually operable switch 29, and also by means of an auxiliary control switch 30 which is operated by means of the pivoted slice support arm 18a. The switch 30 comprises a relatively fixed switch arm 31 carrying a contact 32 and a movable switch arm 33 carrying a contact 34 which cooperates with the contact 32. The switch arm 31 is mounted upon an insulating block 35 supported on the top wall of the base 10, while the switch arm 33 is attached to an insulating block 36 which is fixed to the movable arm 18a.

The arm 18a is oscillated so that it periodically engages the end surface of the slice 15 to test the hardness of the slice, that is, its compressibility, and in engaging the end it tests the compressibility of the complete slice from end to end. The arm is oscillated by means of a constant speed electric motor 37 of any suitable type, and which is energized from the supply source 28. This motor drives a cam 38 through a shaft 39. The cam as it is rotated functions to oscillate the arm 18a through the medium of a flexible arm 40 which has one end rigidly secured to the lower end of the arm 18a, as shown, and its other end positioned to coact with the periphery of the cam 38. A tension spring 41 is secured to this latter end in order to bias the arm 40 counter-clockwise into engagement with the cam.

In the operation of the device, the bread slice 15 will be placed upon the tray 21 when the latter is in its elevated position, and then the knob 27 will be depressed to lower the slice to its toasting position where it is held by means of the latch 25.

Then the switch 29 will be closed. This will energize the motor 37 which at once will begin to rotate the cam 38 and oscillate the member 18a back and forth on its fulcrum 18b so that it periodically engages the end of the bread slice 15. As the arm moves toward the bread slice it will move the contact 34 into engagement with the contact 32 which operation will complete an energizing circuit through the two toaster heater elements 13 and 14, as will be clear from an inspection of Fig. 3. Therefore, the toasting elements will be energized in order to apply toasting heat to the bread slice. However, as the arm 18a moves away from the end of the bread slice it will separate the contacts 32 and 34, and thereby deenergize the heating elements 13 and 14. At the beginning of the operation when the slice is relatively soft, the arm 18a will move through a relatively wide path and, therefore, it will maintain the contacts 32 and 34 closed for a relatively great period of time in proportion to the time that they are open for each oscillating cycle of the arm 18a. For example, at the beginning if the motor is operating at such a speed and the connections between the motor and the arm 18a are such that the arm engages the slice to test its hardness once every ten seconds, the contacts at the start may be closed seven seconds out of the ten.

However, as the slice becomes harder and harder due to progressive toasting, the slice will offer resistance to the arm 18a and thereby shorten its stroke. As a result of this, the proportion of time that the contacts are closed to energize the heaters becomes less and less. In this way a smaller and smaller percentage of the original ten second period is taken up in heating. Eventually, when the slice has been toasted to the desired degree, movement of the arm 18a inwardly will be limited to such an extent that it will not permit the contacts 32 and 34 to close at all, and from then on the heating elements 13 and 14 will be deenergized permanently.

It is to be understood that the motor may continue to function freely even though the path of movement of the arm 18a is progressively decreased, because the arm 40 will flex and thus absorb any motion of the cam 38 not transmitted to the rigid arm 18a.

The basic time setting can be varied by adjusting the position of the normally fixed contact arm 31 by means of an adjusting screw 42 which is adjustable by means of a knob 43. It will be understood that if the knob 43 is adjusted to move the contact arm 41 toward the left, as viewed in Fig. 1, it will decrease the proportion of time that the contacts are closed each cycle, and thus will shorten the total overall toasting period; this will give a lighter toast. Conversely, if the knob 43 be adjusted to permit the switch arm 31 to move to the right it will increase the proportions of time the heat is on, and will increase the overall timing period; this will give a darker toast.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A toaster comprising heating means, means for holding a bread slice in toasting relation with said heating means, means for testing periodically the compressibility of the slice being toasted including a member movable into and out of engagement with the slice and the movement of which is restricted by the slice as it becomes harder due to progressive toasting, and control means operated by said testing member for causing said heating means to apply heat to said slice and to shut off the heat from said slice in a series of cycles, the proportion of time heat is applied during each cycle depending upon the extent of movement of said member so that said heat is applied for shorter periods of time as the toasting of the slice progresses.

2. A toaster comprising heating means, means for holding a bread slice in toasting relation with said heating means, a member movable into and out of engagement with the bread slice, the slice as it becomes harder due to progressive toasting resisting the extent of movement of said member, and a control element for said heating means operated by said member into heat "on" and heat "off" positions as said member moves into and out of engagement with said slice, the proportion of time said member is in the heat "on" position to the time it is in the heat "off" position decreasing as the movement of said member becomes more and more restricted by the increasing hardness of said slice until eventually when said slice has attained a predetermined degree of hardness said control element remains permanently in its heat "off" position.

3. A bread toaster comprising heating means, means for holding the slice of bread in toasting relation with said heating means, a lever, means mounting said lever for movement on a fixed pivot, a motor, connection means between said motor and lever for oscillating said lever, one end of said lever periodically engaging a surface of the bread slice as the lever oscillates, said surface limiting the movement of said lever as the slice becomes harder as toasting progresses, and control means for said heating means operated by said lever to shut off the heat when the movement of said lever becomes limited to a predetermined extent.

4. A bread toaster comprising heating means, means for holding a slice of bread in toasting relation with said heating means, a relatively rigid lever, means mounting said lever for movement on a fixed pivot, a motor, a cam driven by said motor, a member relatively flexible as compared with said lever attached to one end of said lever and operated by said cam to oscillate the lever and thereby cause its other end to move into and out of engagement with a surface of the bread slice, the movement of said lever being restricted more and more by said slice as it becomes harder and harder due to progressive toasting, said flexible member absorbing movement by said cam as the motion of said lever becomes more restricted, and control means for said heating means operated by said lever to shut off the heat when the movement of said lever becomes limited to a predetermined extent.

5. A bread toaster comprising heating means, an open-work rack for holding a slice of bread in toasting relation with said heating means, a section of said rack being movable into and out of engagement with a surface of said slice, means for moving said section into and out of engagement with said slice, the slice as it becomes harder due to progressive toasting resisting the extent of movement of said section, and a control element for said heating means operated by said section into heat "on" and heat "off" positions as said section moves into and out of engagement with said slice, the proportion of time said section is in the heat "on" position to the time it is in the heat "off" position decreasing as the movement of said section becomes more and more restricted by the increasing hardness of said slice due to progressive toasting, until eventually when said slice has attained a predetermined degree of hardness said section holds said control element permanently in its heat "off" position.

6. A bread toaster comprising heating means, means for holding the slice of bread in toasting relation with said heating means, a lever, means mounting said lever for movement on a fixed pivot, a motor, connection means between said motor and lever for oscillating said lever, one end of said lever periodically engaging the end surface of the bread slice to test the compressibility of the complete slice from end to end as the lever oscillates, said surface limiting the movement of said lever as the slice becomes harder as toasting progresses, and control means for said heating means operated by said lever to shut off the heat when the movement of said lever becomes limited to a predetermined extent.

7. A bread toaster comprising heating means, means for holding the slice of bread in toasting relation with said heating means, a lever, a motor, connection means between said motor and lever for oscillating said lever, one end of said lever periodically engaging the end surface of the bread slice to test the compressibility of the complete slice from end to end as the lever oscillates, said surface limiting the movement of said lever as the slice becomes harder as toasting progresses, and control means for said heating means operated by said lever to shut off the heat when the movement of said lever becomes limited to a predetermined extent.

CHAUNCEY G. SUITS.